Sept. 3, 1968 M. C. KAYE ETAL 3,399,564
LOAD CELL
Original Filed July 26, 1965 2 Sheets-Sheet 1
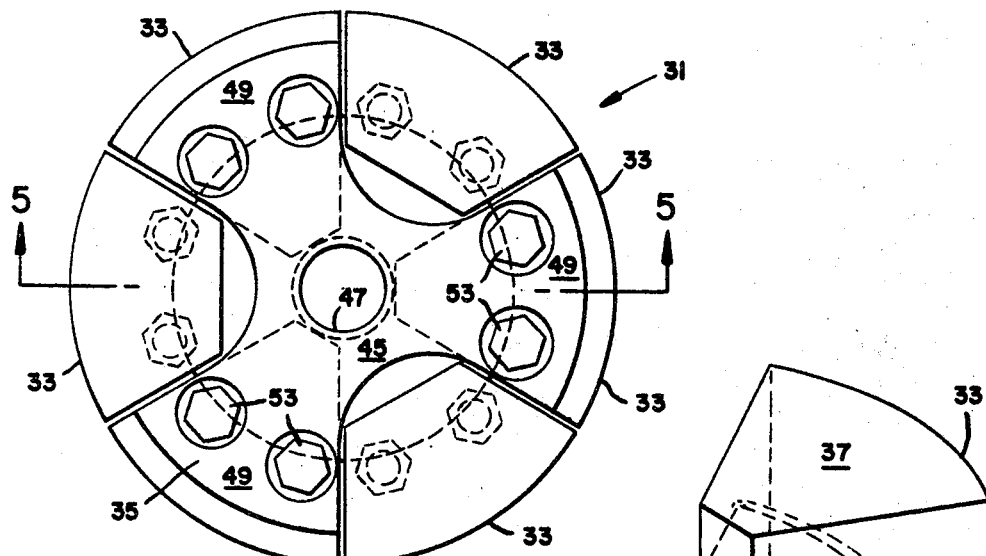
FIG_1.
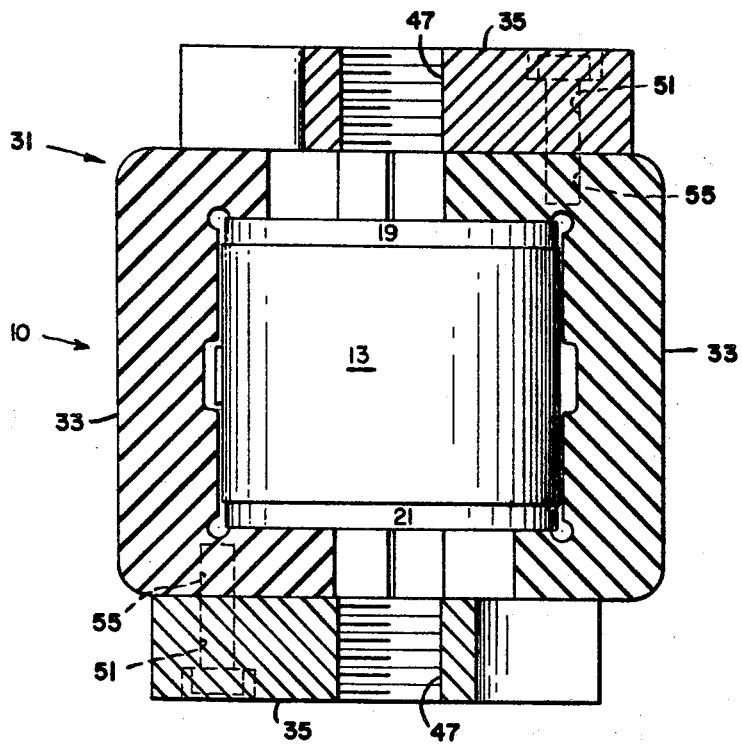
FIG_2.
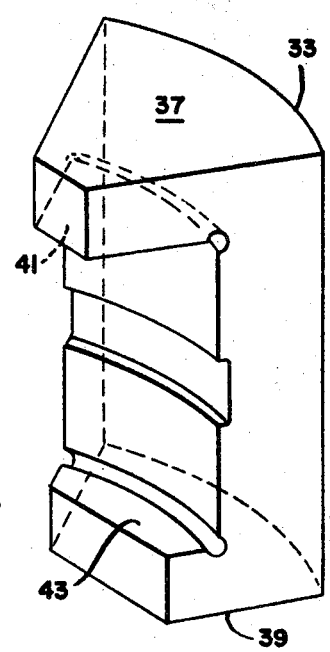
FIG_3.
INVENTOR.
MICHAEL C. KAYE
BY CHARLES J. BERRY
ATTORNEYS Sept. 3, 1968  M. C. KAYE ET AL  3,399,564
LOAD CELL
Original Filed July 26, 1965  2 Sheets-Sheet 2
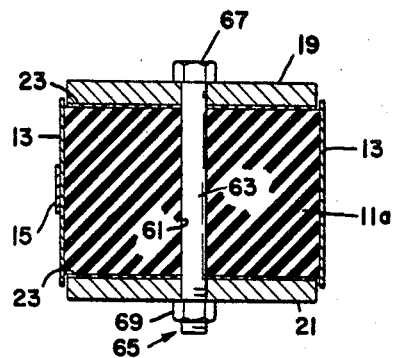
FIG_4
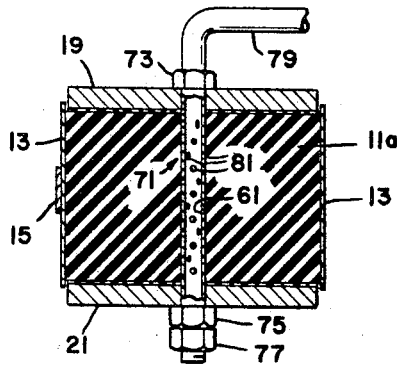
FIG_5
INVENTORS
MICHAEL C. KAYE
CHARLES J. BERRY

United States Patent Office 3,399,564
Patented Sept. 3, 1968

3,399,564
LOAD CELL
Michael C. Kaye, Portland, and Charles J. Berry, Lake
 Oswego, Oreg., assignors to Freightliner Corporation,
 Portland, Oreg., a corporation of Delaware
Original application July 26, 1965, Ser. No. 474,924, now
 Patent No. 3,313,151, dated Apr. 11, 1967. Divided and
 this application Dec. 27, 1966, Ser. No. 604,877
5 Claims. (Cl. 73—141)

ABSTRACT OF THE DISCLOSURE

A load cell in which a thin-walled ring surrounds an elastomer core in compressed relation thereto, wherein pressure may be applied to the ends of the core to expand the ring, the ring having sensing means to sense the degree of expansion, wherein there is a case around the ring and core to transmit compressive forces to the core when the case is loaded in either compression or tension, or wherein torque pressure can be applied to the load cell to alter the compressive load thereon whereby the degree of torque can be measured, or wherein hydraulic fluid can be injected into the core to effect an expansion or contraction of the ring.

CROSS REFERENCES TO RELATED APPLICATIONS

This application is a division of application Ser. No. 474,924, filed July 26, 1965, entitled, "Load Cell," now Patent No. 3,313,151. Application Ser. No. 474,924 is a continuation-in-part of application Ser. No. 267,654, filed Mar. 28, 1963, entitled, "Load Cell" (now abandoned).

BACKGROUND OF THE INVENTION

*Field of invention*

The invention relates to load cells, and particularly load cells of the type in which an elastomer core is surrounded by a ring wherein pressure can be applied to the core to effect expansion or contraction of the ring, and such expansion or contraction can be sensed, such as by a strain gauge. The present invention comprises several embodiments; one, wherein a special case surrounds the core and is so constructed that a compressive force or tensile force applied to the case will in either case effect a compression of the core. In another embodiment, a device passes through thec ore and is so arranged that the torque force applied to the device will be effective to compress the core so that torque can be measured. In another embodiment of the invention, hydraulic fluid can be conducted to the interior of the elastomer core to expand the ring so that the pressure of the fluid can be detected.

*Description of the prior art*

The prior art known to the applicants particularly includes the reference patents cited against the application above referred to, but such prior art is not suited to converting either tensile or compressive forces on a load cell case into only compressive forces, and does not contemplate the other embodiments referred to above.

BRIEF SUMMARY OF THE INVENTION

In one embodiment of the invention, a thick metal case surrounds the load cell with the segments having upper and lower fingers in compressive operative relation with the elastomer core of the cell. Load transmitting plates at the opposite ends of the case are so attached to the segments of the case that a separating force applied to the plate will cause certain fingers to compress the elastomer core of the load cell, whereas a compressive force applied to the plates will enable other fingers to apply compressive force to the load cell so that whether the applied force is either tension or compression, the resulting pressure on the elastomer core of the load cell is always in compression.

In another embodiment of the invention, an arrangement is provided whereby a torque force applied to a device connected to the load cell alters the compressive force applied to the elastomer core, whereby torque can be measured by the load cell.

In another embodiment, hydraulic pressure can be conducted to the interior of the elastomer core to cause expansion of the same so that a reading proportional to the pressure can be obtained.

BRIEF DESCRIPTION OF THE DRAWINGS

FIG. 1 is a top plane view of a case enclosing a load cell, the case being constructed in accordance with the present invention;

FIG. 2 is a sectional view of the structure in FIG. 1, taken along lines 5—5 of FIG. 1;

FIG. 3 is an isometric view of a C-shaped member of the case shown in FIGS. 1 and 2;

FIG. 4 is a cross sectional view in elevation of a load cell of the invention, showing the same particularly adapted to the torque measuring device;

FIG. 5 is a cross sectional view in elevation of a load cell of the invention showing the same adapted to measure hydraulic pressure.

DESCRIPTION OF PREFERRED EMBODIMENTS

The load cell 10 disclosed in FIG. 2 is like that in Patent No. 3,313,151. There is an elastomer core, not shown in FIG. 2, within the thin-walled ring 13 and end plates 19 and 21 project into the ends of the ring 13 in close proximity thereto and into bonded engagement with the elastomer core.

The load cell is surrounded by a case or housing 31 which consists of identical halves, each half comprising three C-shaped members 33 fastened to a star-shaped plate 35. The plates are disposed at opposite ends of the load cell, and the C-shaped members of each half are interleaved with the C-shaped members of the other half.

The C-shaped members 33 are pie shaped (FIG. 3), and are provided with top and bottom fingers 37 and 39 having opposed parallel inner faces 41 and 43 for spanning across the ends of the cell 10 to contact the end plates 19 and 21 thereof. These spaces between the inner faces correspond to the spacing between the outer faces of the end plates 19 and 21. The bottom finger of each member 33 is provided with a threaded well opening toward the end of the member 33.

Each of the star shaped plates has a central portion 45 including a threaded hole 47, and three radial arms 49 extending outwardly from the central portion 45. Each of the radial arms 49 has a bolt passageway 51 therein for receiving a bolt 53 which engages the threaded well 55 in the arm to thereby fasten the C-shaped member to the corresponding plate.

The star shaped plates 35 and the C-shaped member 33 are assembled about the load cell, the bottom portion of one member being adjacent the top of the next, etc. (alternate C-shaped members are oppositely arranged). The members 33 surround and protect the load cell. When tension is applied, as by means engaging the threaded holes in the plates, the inner faces of the top fingers of the C-shape compress the load cell. When compression is applied to the housing, the inner faces of the bottom fingers compress the cell. In the latter case, the top fingers of the C-shaped members pass into the spaces between the arms of the plates.

Referring now to FIG. 4, there is shown a load cell of the invention adapted for use as a torque measuring device. The core 11a is provided with an axial bore 61 therethrough for receiving the shank portion 63 of a bolt 65 of the same diameter, having at one end a head 67 which abuts the top plate 19, and a nut 69 threaded to its opposite end so as to abut the bottom plate 21. The bolt permits compression to be applied to the cell and also serves to prevent expansion of the core into the bore when the cell is loaded. The torque to be measured is applied to the nut 69 to thereby compress the load cell and generate a response in the strain gauge. The resultant compression is calibrated into suitable torque units.

Referring to FIG. 5, there is shown a load cell of the invention adapted for use as a hydraulic pressure sensor. As in FIG. 4, the core 11a is provided with an axial bore 61 therethrough. The bore is fitted with a bolt-like pipe section 71, of the same diameter, having a collar 73 at its top for contacting the top plate 19, and a pair of lock nuts 75 and 77 threaded onto the opposite or bottom end of the section 71 for contacting the bottom end plate 21. The pipe section is open at the top to receive hydraulic fluid under pressure as by threadingly engaging a line 79 from a source to be measured to the section 71. The wall of the pipe section is provided with a plurality of perforations 81 therein for permitting the hydraulic fluid to impinge upon the wall of the bore 61. In operation, the lock nuts 75 and 77 are tightened into locking engagement to thereby retain the end plates 19 and 21 in fixed relation. Thus, the application of hydraulic pressure within the core acts solely to expand against the shell.

Having described the invention in what is considered to be the preferred embodiment thereof, it is desired that it be understood that the invention is not to be limited other than by the provisions of the following claims.

We claim:
1. A load cell assembly comprising an elastomer core of circular cross section, a cylindrical shell encircling said core, said core having a relaxed diameter greater than the inside diameter of the shell so that when said shell is placed over the core, the shell is prestressed thereby, a transducer mounted on said shell to give an electrical indication of the strain induced in said shell when said core is subsequently stressed, and housing means around said core and comprising relatively movable housing parts each in thrust-transmitting relation to both ends of said core, and means for effecting relative separating movement of said parts in one direction in response to compressive loading of said parts, and in the opposite direction in response to tensile loading of said parts to effect compressive loading of said core in both directions of relative movement of said parts.

2. A load cell as in claim 1 including end plates for said core and in which said movable housing parts comprise C-shaped members, each having a spaced pair of fingers engaging the outer faces of said end plates, the fingers of each C-shaped member being spaced from the fingers of each other C-shaped member.

3. A load cell assembly comprising an elastomer core of circular cross section, a cylindrical shell encircling said core, said core having a relaxed diameter greater than the inside diameter of the shell so that when said shell is placed over the core, the shell is prestressed thereby, a transducer mounted on said shell to give an electrical indication of the strain induced in said shell when said core is subsequently stressed, and fluid pressure transmitting means extending into said core for imparting radially outwardly directed compressive forces to said core from the interior thereof in response to an applied fluid pressure.

4. A load cell assembly as in claim 3 wherein said fluid pressure transmitting means includes means for conducting hydraulic fluid under pressure to the interior of said core.

5. A load cell assembly comprising an elastomer core of circular cross section, a cylindrical shell encircling said core, said core having a relaxed diameter greater than the inside diameter of the shell so that when said shell is placed over the core, the shell is prestressed thereby, a transducer mounted on said shell to give an electrical indication of the strain induced in said shell when said core is subsequently stressed, and housing means for transmitting compressive forces to said core for either tensile or compressive loading of said housing means, there being end plates for said core and said housing means comprising a plurality of C-shaped members having top and bottom fingers with opposed axially inwardly facing parallel faces contacting said end plates of the load cell, said C-shaped members arranged about the perimeter of said load cell to surround the same, the bottom finger of each C-shaped member lying next to the top finger of the adjacent member, a pair of star-shaped plates, each of said plates fastened to the bottom fingers of the C-shaped members at one end of the cell, and having relieved portions for accommodating movement of the associated top fingers of the C-shaped members when either compressive or separating forces are applied to said star-shaped plates.

References Cited

UNITED STATES PATENTS

| 2,634,721 | 4/1953 | Greenwood | 73—398 X |
| 2,998,585 | 8/1961 | Bodner et al. | 73—398 X |
| 3,021,747 | 2/1962 | Garrett. | |
| 3,153,772 | 10/1964 | Dorr. | |

RICHARD C. QUEISSER, *Primary Examiner.*

CHARLES A. RUEHL, *Assistant Examiner.*